UNITED STATES PATENT OFFICE.

GUY C. GIVEN, OF TAMAQUA, PENNSYLVANIA, ASSIGNOR TO ATLAS POWDER COMPANY, OF WILMINGTON, DELAWARE, A CORPORATION OF DELAWARE.

METHOD OF PRODUCING AMMONIUM PERCHLORATE.

1,273,477.     Specification of Letters Patent.     Patented July 23, 1918.

No Drawing.     Application filed September 10, 1917. Serial No. 190,551.

*To all whom it may concern:*

Be it known that I, GUY C. GIVEN, a citizen of the United States, residing at Tamaqua, in the county of Schuylkill and State of Pennsylvania, have invented certain new and useful Improvements in Methods of Producing Ammonium Perchlorate, of which the following is a specification.

The present invention relates to an improved method of producing ammonium perchlorate by which difficult and expensive steps heretofore employed to this end are superseded by steps that are relatively simple and highly economical.

It has been found impossible, in practice, to produce ammonium perchlorate by the electrolytic treatment of ammonium chlorate on account of the instability of the intermediate products. It has therefore been necessary, heretofore, to manufacture ammonium perchlorate by treatment of the perchlorate of sodium with ammonium chlorid, ammonium sulfate or ammonium nitrate. These methods are technically difficult and expensive.

I have discovered, however, that it is possible to produce ammonium perchlorate from sodium perchlorate or potassium perchlorate, or any soluble perchlorate salts, by treatment of either of these perchlorate salts with ammonia gas, the cheapest form of ammonia, in the presence of carbon dioxid or carbonic acid either of which are very cheap materials.

In carrying out the invention I saturate a solution of soluble perchlorate salt, such as sodium perchlorate or potassium perchlorate for example, with ammonia gas and treat the resulting solution with carbon dioxid or carbonic acid. The ammonia and carbonic acid may also be mixed in a separate vessel forming ammonium bicarbonate, which is added to the soluble perchlorate salt. It is to be understood however that the invention contemplates the employment of any suitable substitute for the carbon dioxid or carbonic acid.

This method of producing ammonium perchlorate offers decided advantages over the methods commonly employed, in that it makes use of the cheapest of raw materials, and offers only inconsequential technical difficulties.

Having now described my invention, that which I claim to be new and desire to cover by Letters Patent is the following:

1. The herein described method of producing ammonium perchlorate, which consists in the reacting upon sodium perchlorate with carbon dioxid or carbonic acid in the presence of ammonia.

2. The herein described method of producing ammonium perchlorate which consists in the reacting upon any soluble perchlorate salt, with carbon dioxid or carbonic acid in the presence of ammonia.

3. The herein described method of producing ammonium perchlorate which consists in the reacting upon any soluble perchlorate salt with ammonium bicarbonate.

In testimony whereof I affix my signature in the presence of two witnesses.

GUY C. GIVEN.

Witnesses:
    GEORGE CHRIST,
    E. F. REESER.